United States Patent
Ogasawara et al.

(10) Patent No.: US 8,492,024 B2
(45) Date of Patent: Jul. 23, 2013

(54) WIRE ARRANGEMENT BODY, BUSBAR MODULE AND POWER-SUPPLY UNIT

(75) Inventors: Shigeyuki Ogasawara, Makinohara (JP); Keizo Aoki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 198 days.

(21) Appl. No.: 12/858,678

(22) Filed: Aug. 18, 2010

(65) Prior Publication Data

US 2011/0064987 A1    Mar. 17, 2011

(30) Foreign Application Priority Data

Sep. 17, 2009   (JP) ................. 2009-215511

(51) Int. Cl.
 *H01M 2/02*  (2006.01)
(52) U.S. Cl.
 USPC ............ 429/170; 429/121; 429/122; 429/151
(58) Field of Classification Search
 USPC .................. 429/170, 121, 122, 151
 See application file for complete search history.

(56) References Cited

U.S. PATENT DOCUMENTS

| | | |
|---|---|---|
| 6,290,552 B1 | 9/2001 | Saito et al. |
| 6,390,858 B2 | 5/2002 | Saito et al. |
| 6,428,364 B2 | 8/2002 | Saito et al. |
| 6,431,921 B2 | 8/2002 | Saito et al. |
| 7,883,342 B2 | 2/2011 | Yoshida et al. |
| 2001/0039150 A1 | 11/2001 | Saito et al. |
| 2001/0044241 A1 | 11/2001 | Saito et al. |
| 2001/0046816 A1* | 11/2001 | Saito et al. ............ 439/736 |
| 2008/0299799 A1 | 12/2008 | Yoshida et al. |

FOREIGN PATENT DOCUMENTS

| | | |
|---|---|---|
| CN | 101316031 A | 12/2008 |
| EP | 1054461 A2 | 11/2000 |
| JP | 2009-43637 A | 2/2009 |
| WO | 2009/022521 A1 | 2/2009 |

OTHER PUBLICATIONS

Communication dated Dec. 4, 2012 from the State Intellectual Property Office of P.R. China in a counterpart application No. 201010286917.4.

* cited by examiner

*Primary Examiner* — Jane Rhee
(74) *Attorney, Agent, or Firm* — Sughrue Mion, PLLC (57) ABSTRACT

A wire arrangement body includes: a wire arrangement groove portion of a tank shape that has a bottom wall portion and both side wall portions; a lid portion that is rotatably connected to one side wall portion of the wire arrangement groove portion through a hinge and covers the wire arrangement groove portion so as to seal a groove opening of the wire arrangement groove portion; and an engagement portion that causes the lid portion to engage with the other side wall portion of the wire arrangement groove portion when the lid portion covers the wire arrangement groove portion. The wire arrangement body is provided so that a center position of the hinge and a center position of the engagement portion are aligned in parallel with a width direction of the wire arrangement body.

3 Claims, 8 Drawing Sheets

WIRE ARRANGEMENT BODY, BUSBAR MODULE AND POWER-SUPPLY UNIT

BACKGROUND OF THE INVENTION

1. Technical Field

The present invention relates to a power-supply unit that is used in hybrid automobiles, electric automobiles or the like, a busbar module that constitutes the power-supply unit and a wire arrangement body that constitutes the busbar module.

2. Background Art

For example, a power-supply unit that is shown in JP-A-2009-43637 (WO 2009/022521A1) is mounted in various automobiles such as electric automobiles that run using an electric motor, hybrid automobiles that run using an engine and an electric motor together and the like, as the electric power source of the electric motor. The power-supply unit includes a battery assembly having a plurality of batteries in which a positive electrode is provided in one end and a negative electrode is provided in the other end, and the positive electrode and the negative electrode are alternatively arranged adjacent to each other; and a busbar module that is overlapped in a surface in which the electrodes of the battery assembly are provided.

Figure 7:
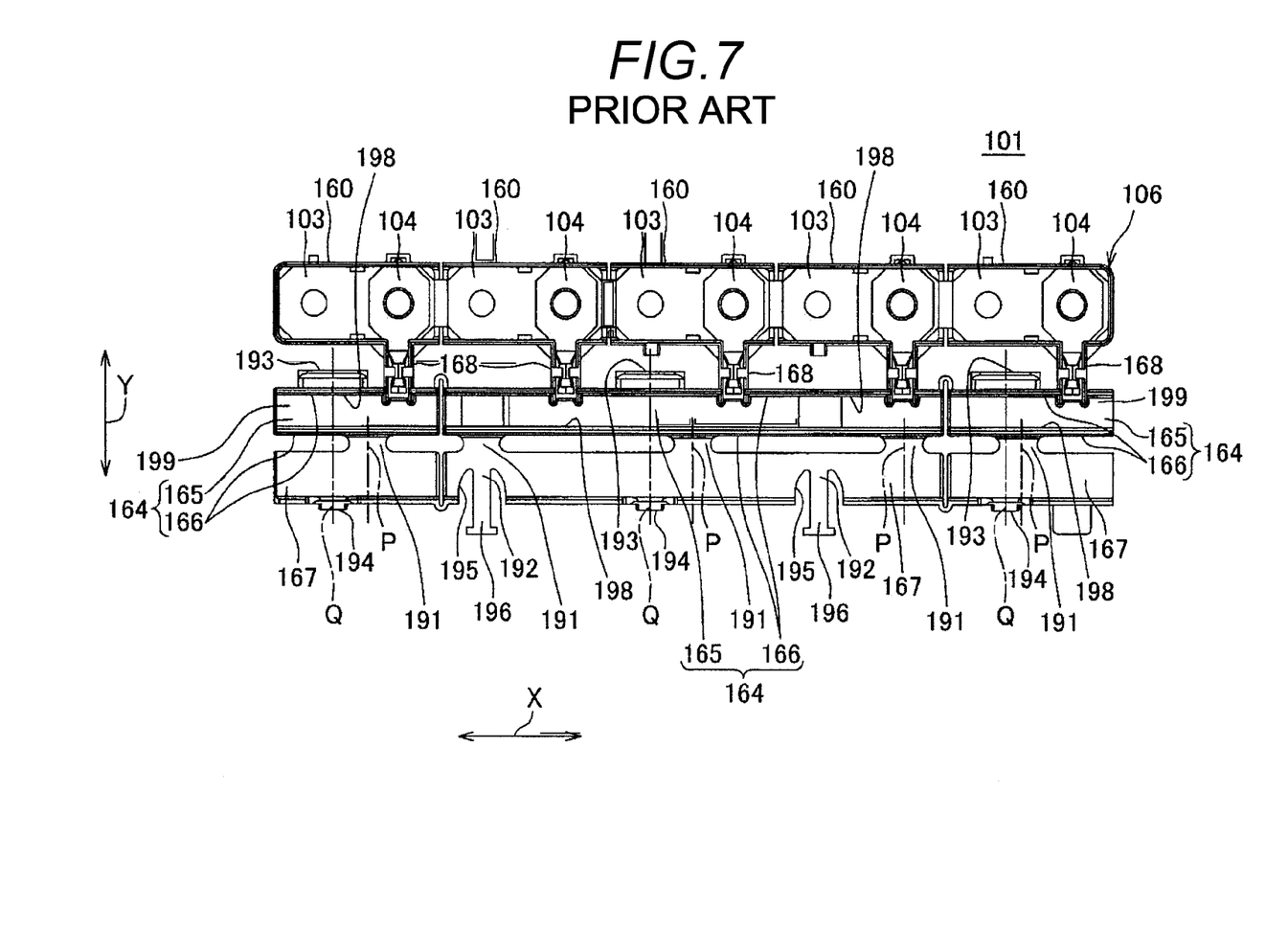
FIG. 7 is a plan view showing a busbar module known in the related art.
Figure 8:
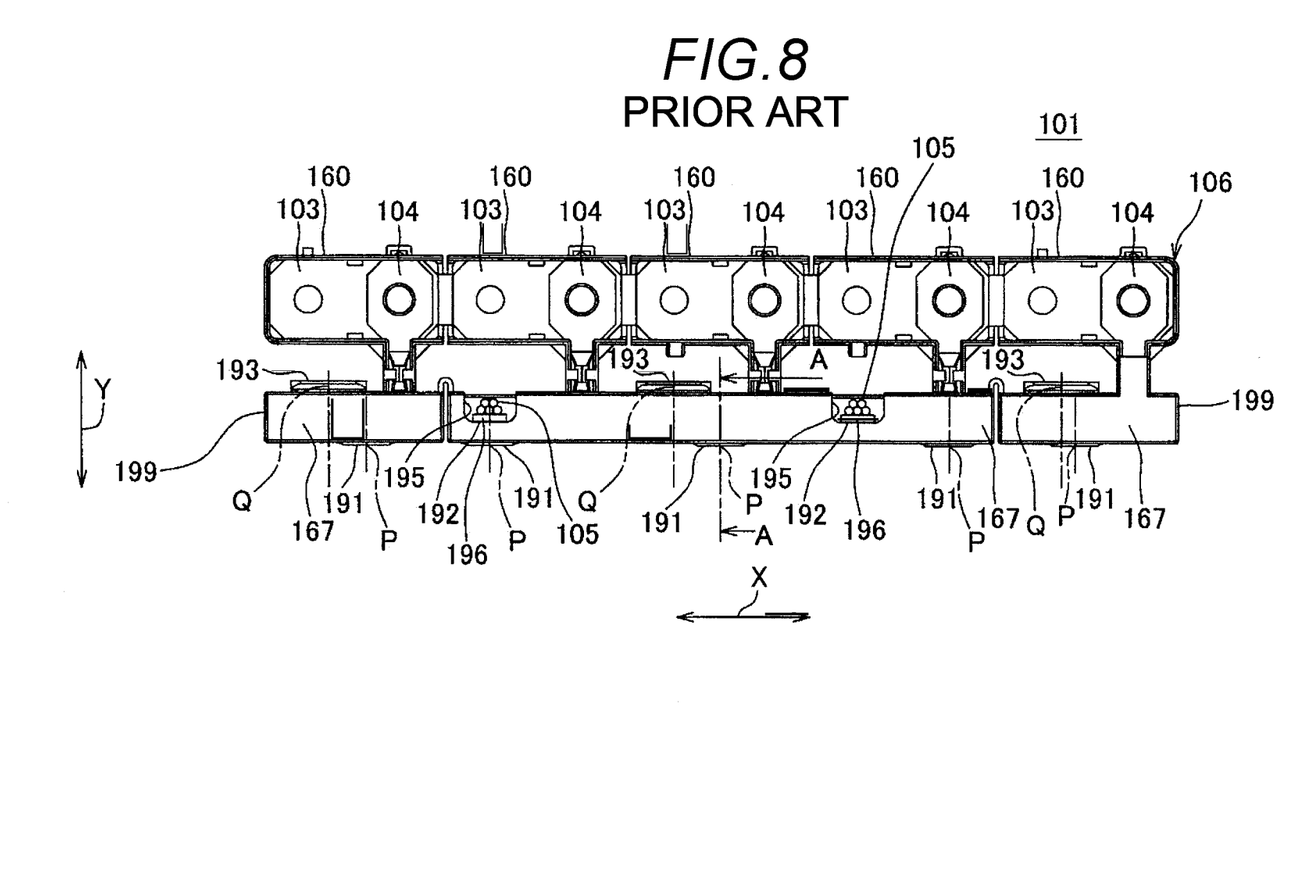
FIG. 8 is a plan view showing a second receiving portion after covered by the lid portion in the busbar module of FIG. 7.

An example of the busbar module that is used in the power-supply unit is shown in FIG. 7 to FIG. 9C. The busbar module 101 as shown in each drawing includes a plurality of busbars 103 that connects between the electrodes of the adjacent batteries of the battery assembly not shown in the drawings so as to connect a plurality of batteries in series, a plurality of terminals 104 that is overlapped in each busbar 103 and are simultaneously connected to the electrode of each battery so as to be used for detecting the voltage of the battery, a plurality of wires 105 attached (connected) in each terminal 104, and a plate 106 as a wire arrangement body receiving a plurality of busbars 103, a plurality of terminals 104 and a plurality of wires 105. Also, in FIG. 7 and FIG. 8, a plurality of wires 105 is omitted. And, an arrow X in FIG. 7 and FIG. 8 shows the arrangement direction of a plurality of batteries.

The plate 106 includes a plurality of first receiving portions 160, a plurality of second receiving portions 164 as wire arrangement groove portions, a plurality of third receiving portions 168 and a plurality of lid portions 167.

The first receiving portion 160 is formed substantially in a tank shape including a bottom wall portion having a rectangular shape, and a peripheral wall portion that is vertically disposed from the surrounding edge of the bottom wall portion, so that the busbars 103 and terminals 104 are received in the first receiving portion 160. Also, a plurality of the first receiving portions 160 is aligned in a row so that the longitudinal direction thereof follows along the arrangement direction (the arrow X direction) of a plurality of batteries. Also, the adjacent first receiving portions 160 are connected to each other.

The second receiving portion 164 is formed in a tank shape (also called, a groove shape) having a bottom wall portion 165 and both side wall portions 166 and 166, and in which a plurality of wires 105 is received. A plurality of second receiving portions 164 is adjacent to each other and lined in a row so that the longitudinal direction thereof follows the arrangement direction (the arrow X direction). A row including the plurality of second receiving portions 164 is arranged in parallel with a gap to a row including a plurality of first receiving portions 160. Also, the plurality of first receiving portions 160 and the plurality of second receiving portions 164 are communicated by a plurality of third receiving portions 168 formed in tank shape.

The lid portion 167 is formed in the rectangular shape and covers the second receiving portion 164 so as to seal the groove opening 198 of the second receiving portion 164. One end portion of the lid potion 167 among the both edge portions (the long side portions) facing each other along the width direction (the arrow Y direction orthogonal to the longitudinal direction (the arrow X direction)) is continuously provided in one side wall portion 166 of the second receiving portion 164 through a first hinge 191. The lid portion 167 is provided in the second receiving portion 164 to be able to open/close about the first hinge 191 as the center of rotation. The first hinge 191 is curved when the lid portion 167 covers (in other words, closes) the second receiving portion 164.

Also, a lock click 194 that is engaged in the click receiving portion 193 mounted on the outer surface of the other side wall portion 166 of the second receiving portion 164 is provided in the other side edge portion of the lid portion 167. The lock click 194 is engaged in the click receiving portion 193 so that the lid portion 167 maintains the state that the second receiving portion 164 is covered (in other words, closed) by the lid portion 167.

Also, a plurality of notch portions 195 that has substantially rectangular shape is provided in the other side edge portion of some of the lid portions 167 so as to take out the wire 105 that is arranged in the second receiving portion 164. Generally, the wire 105 is taken out from the end opening 199 of the second receiving portion that is arranged in an end of the plurality of second receiving portions 164 being lined in a row, however for example, in a case of the arrangement position of the power-supply unit that is provided in the automobiles, the wire 105 is taken out from the second receiving portion 164 that is arranged in near the center thereof, so that it is the case that the wire 105 can be easily arranged in the automobiles, for that reason, the notch portion 195 is provided.

The wire drawing piece 196 is continuously provided in the bottom end of the notch portion 195 (in other words, the edge portion faces the opening of the notch portion 195), through the second hinge 192. The wire drawing piece 196 is rotatably provided about the second hinge 192 as the center of rotation in the lid portion 167. A plurality of wires 105 that is taken out through the notch portion 195 from the second receiving portion 164 is attached in the wire drawing piece 196 by the tape 197 as a constraining member. Thus, the wire drawing piece 196 supports a plurality of wires 105 along a predetermined direction (the direction from the rear side to the front side in FIG. 8).

Thus, in the above described busbar module 101, the plurality of wires 105 is received and arranged in the second receiving portion 164 in which the groove opening 198 is closed by the lid portion 167, so that the plurality of wires 105 can be protected from the contact with the other members or impact from the outside and the disadvantage of the cutting, shorting or the like of a plurality of wires 105 can be prevented.

Figure 9A:
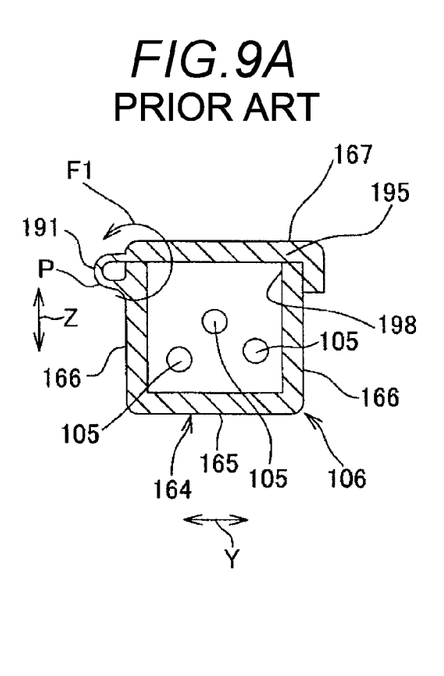
Figure 9B:
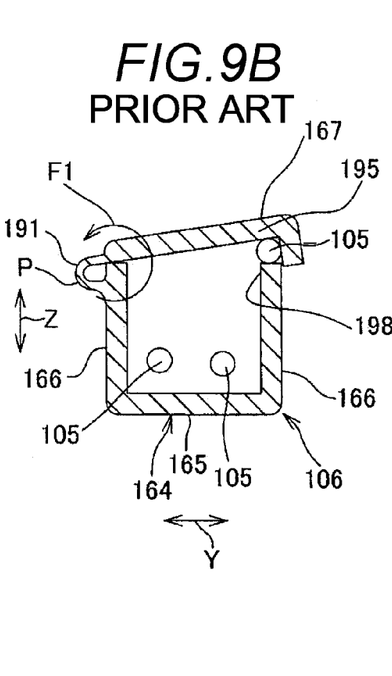
Figure 9C:
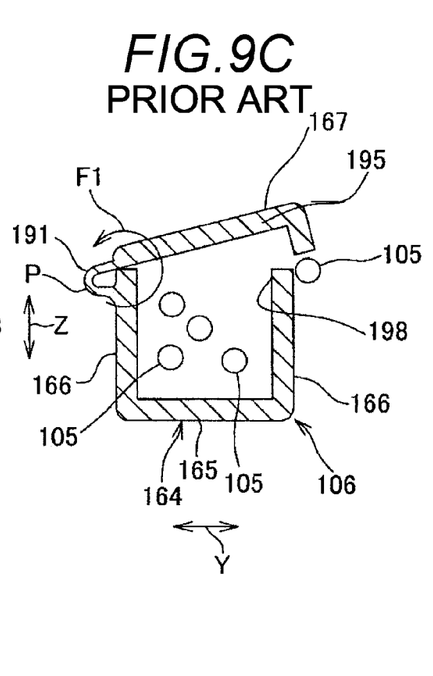

However, in the busbar module 101 (that is, plate 106), a center position P of the first hinge 191 and a center position Q of the lock click 194 are arranged to be deviated each other along an X direction, so that in the state that the lid portion 167 covered the second receiving portion 164, usually, a plurality of wires 105 is received in the second receiving portion 164 as shown in FIG. 9A. However, the curved first hinge 191 returns to the original shape (in other words, the lid portion 167 is opened), and a rotation force F1 (in other words, a force turns up the lid portion 167 about the first hinge 191 as a center of the rotation) that rotates the lid portion 167 in counterclockwise in the drawing, along the width direction from the center position P of the first hinge 191 is generated, thus there is a concern that the lid portion 167 is twisted and thus a portion of the other side edge portion (the edge portion of the other side wall portion) facing to the center position P in the width direction is floated, and the lid portion 167 is opened. Thus, the wire 105 is caught (bite of the wire) between the second receiving portion 164 and the lid portion 167 as the lid portion 167 is opened as shown in FIG. 9B, and the wire 105 is deviated from the second receiving portion 164 as shown in FIG. 9C, so that there is a problem that the plurality of wires 105 is not protected.

SUMMARY OF THE INVENTION

Thus, the present invention pays attention to the above described problem and it is an object of the invention to provide a wire arrangement body, a busbar module and a power-supply unit in which a lid portion that seals the wire arrangement groove portion can not be opened, even in the case that the curved hinge is returned to the original shape.

In order to achieve the object, there is provided a wire arrangement body, including: a wire arrangement groove portion of a tank shape that has a bottom wall portion and both side wall portions; a lid portion that is rotatably connected to one side wall portion of the wire arrangement groove portion through a hinge and covers the wire arrangement groove portion so as to seal a groove opening of the wire arrangement groove portion; and an engagement portion that causes the lid portion to engage with the other side wall portion of the wire arrangement groove portion when the lid portion covers the wire arrangement groove portion, wherein the wire arrangement body is provided so that a center position of the hinge and a center position of the engagement portion are aligned in parallel with a width direction of the wire arrangement body.

There can be provided a busbar module, including: a plurality of busbars that connect respective batteries of a battery assembly having a plurality of batteries; a plurality of wires that is connected to the respective batteries through the plurality of busbars; and a wire arrangement body as defined above, that receives the plurality of wires.

There can be provided a power-supply unit, including: a battery assembly having a plurality of batteries; and a busbar module as defined above, that is attached in an overlapped manner to the battery assembly and connects the respective batteries to each other.

The wire arrangement body may be configured in that the engagement portion includes a click receiving portion provided in an outer surface of the other side wall portion of the wire arrangement groove portion and a lock click provided in an edge portion of the lid portion, and to be engaged with the click receiving portion.

According to the configurations, in the wire arrangement body, the direction of the center position of the hinge that is continuously coming into contact with the lid portion in one side wall portion of the wire arrangement groove portion and the center position of the engagement portion that engages the lid portion and the other side wall portion of the wire arrangement groove portion is provided in parallel with the width direction of the wire arrangement groove portion so that in the state that the lid portion is covered with the wire arrangement groove portion, even when the curved hinge is returned to the original shape (in other words, the state that the lid portion is opened), and a turning up force applied to the lid portion is generated about the hinge as the center of rotation from the center position of the hinge in the width direction, the engagement portion engages the other side edge portion facing the center position of the hinge in the width direction in the lid portion, and thus it is possible to prevent the lid portion from being twisted and a part of the lid portion from being floated, thus the lid portion is prevented from being opened.

BRIEF DESCRIPTION OF THE DRAWINGS

In the accompanying drawings:

FIGS. 9A to 9C are cross sectional views taken along A-A line of FIG. 8, in which FIG. 9A shows a state that a plurality of wires is received in a second receiving portion, FIG. 9B shows a state that the wire is caught between the second receiving portion and the lid portion, and FIG. 9C shows a state that the wire is deviated from the second receiving portion.

DETAILED DESCRIPTION OF THE EXEMPLARY EMBODIMENTS

An embodiment of an electric power source according to the present invention is described referring to FIG. 1 to FIG. 6. Also, for convenience of the description, the arrangement direction of each member is shown using an arrow X, an arrow Y and an arrow Z in each drawing. The arrow X, the arrow Y and the arrow Z are orthogonal to one another.

Figure 1:
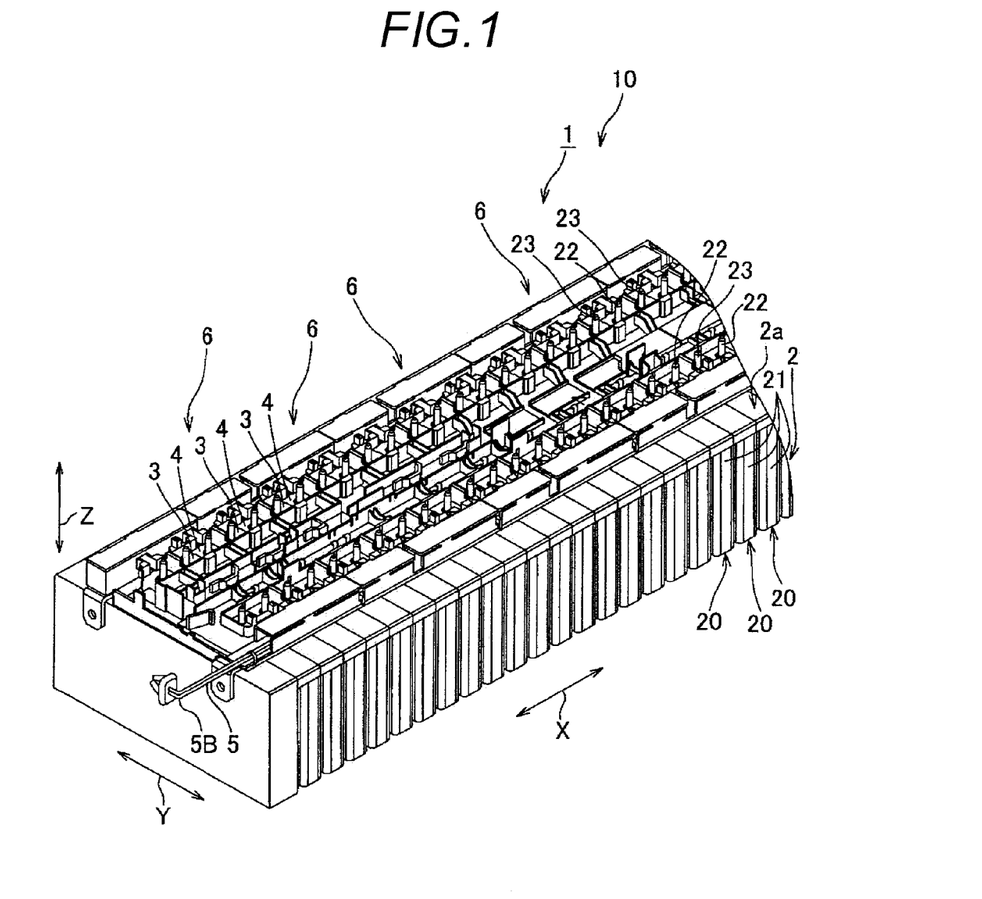
FIG. 1 is a perspective view showing a power-supply unit according to an embodiment of the invention.

A power-supply unit 10 in FIG. 1 includes a battery assembly 2 and a busbar module 1 that is provided overlapped and attached to the battery assembly 2. The power-supply unit 10 is mounted on electric automobiles that runs using a battery motor or on hybrid automobiles that run using an engine and an electric motor jointly and supply electric power to the electric motor.

The battery assembly 2 is constituted by a plurality of batteries 20 that is arranged in a row along one direction (the arrow X direction in FIG. 1) and is fixed one another. Each battery 20 includes a rectangular parallelepiped shape battery main body 21 and a pair of electrodes 22 and 23 that is mounted on the battery main body 21 and respectively projected from one end and the other end of a surface of the battery main body 21. One electrode 22 of the pair of electrodes 22 and 23 is a positive electrode 22 and the other electrode 23 is a negative electrode 23. A pair of electrodes 22 and 23 is formed in a cylindrical shape with an electric conductive metal respectively. Each battery 20 is arranged so that the surface on which a pair of the electrodes 22 and 23 is mounted in the battery main body 21 is to be directed in the same direction (the upper direction in FIG. 1), and the battery main body 21 of the adjacent battery 20 contact each other, also the positive electrode 22 of one battery 20 and the negative electrode 23 of the other battery 20 that is adjacent to the battery 20 are arranged alternatively to be adjacent to each other (in other words, in the order of the positive electrode 22, the negative electrode 23, the positive electrode 22, the negative electrode 23, . . . along the arrow X direction).

Figure 2:
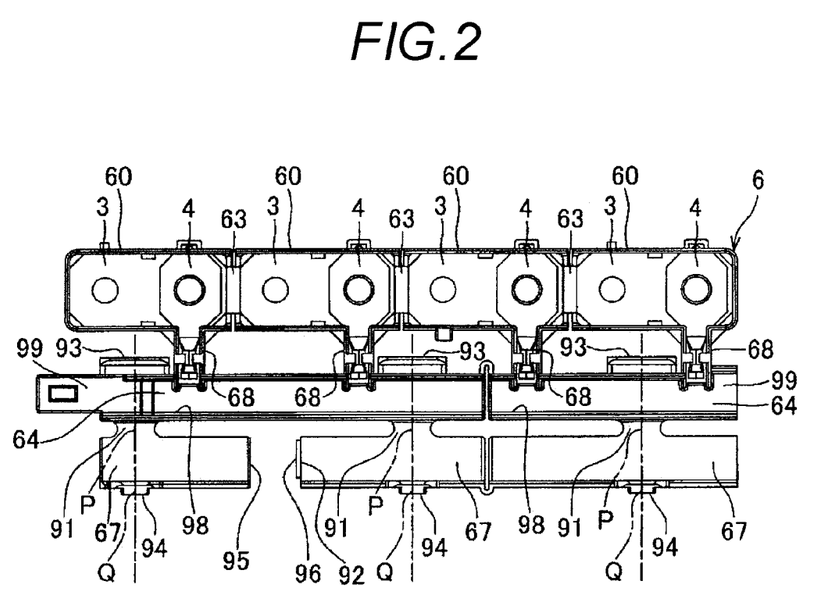
FIG. 2 is a plan view showing a busbar module that is provided in the power-supply unit of FIG. 1.
Figure 3:
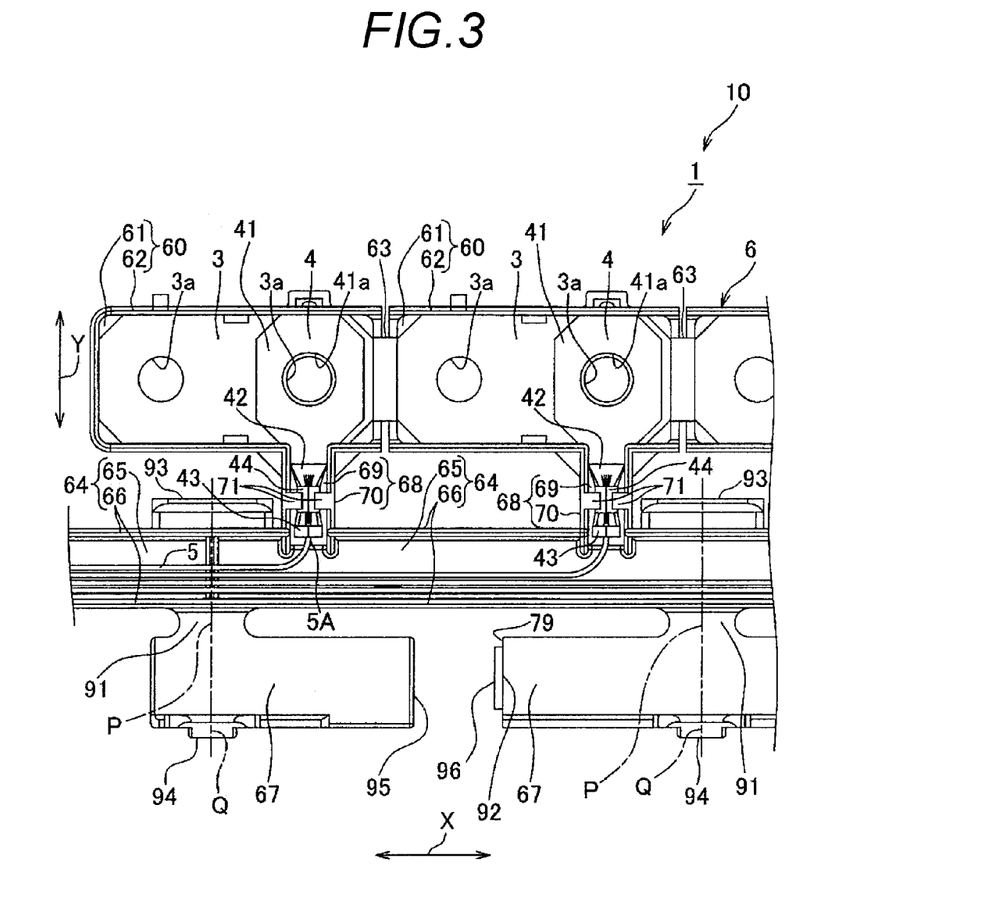
FIG. 3 is a partially enlarged view showing the busbar module of FIG. 2.

The busbar module 1 is connected to the plurality of the batteries 20 in series. As shown in FIG. 2 and FIG. 3, the busbar module 1 includes a plurality of busbars 3, a plurality of terminals 4, a plurality of wires 5 and plates 6 as a plurality of wire arrangement bodies.

The busbars 3 are attached on the positive electrode 22 and the negative electrode 23 adjacent to each other of the battery 20 of the battery assembly 2, so as to connect the respective battery 20 in series. The busbars 3 are obtained by press machining in the conductive metal plate and are provided with a pair of holes 3a in which the positive electrode 22 and the negative electrode 23 adjacent to each other of the battery 20 are passed in the substantially rectangular shaped metal plate. A pair of holes 3a is positioned along the longitudinal direction of the busbars 3 with the same interval as that of the positive electrode 22 and the negative electrode 23 adjacent to each other of the battery 20. Also, the busbars 3 are screwed together with nuts (not shown in the drawings) to the positive electrode 22 and the negative electrode 23 that pass through the holes 3a so as to be attached (fixed) on the battery 20, and are electrically connected to the positive electrode 22 and the negative electrode 23.

Terminals 4 are overlappingly arranged to the corresponding busbars 3, so as to be connected to the positive electrode 22 and the negative electrode 23 adjacent to each other of the batteries 20 via the busbars 3. The terminal 4 is obtained by press machining or the like in the conductive metal plate, and includes a busbar connection portion 41 and a wire attachment portion 42.

The busbar connection portions 41 is overlappingly and electrically connected to the busbars 3 and is formed as a substantially rectangular shape, and a hole 41a is provided in the center portion thereof. The length of each side of the busbar connection portions 41 is substantially the same as or slightly smaller than the short side of the busbars 3. The hole 41a is overlapped in one side of a pair of holes 3a of the busbars 3, so that the positive electrode 22 and the negative electrode 23 of the battery 20 pass through. The busbar connection portion 41 is attached to the battery 20 by a nut in the state that it is overlapped with the busbars 3.

The wire attachment portion 42 is a substantially rectangular plate shaped piece that is connected in parallel with one side of the busbar connection portion 41. A pair of wire cocking peaces 43 that fixes a coating portion coated with electric insulation coating of the one end 5A of the wire 5 is provided on the front end portion of the wire attachment portion 42 as described in below. A pair of the press pieces 44 is provided in the center portion of the wire attachment portion 42, wherein an exposed core wire is attached under pressure to electrically connect to the core wire in one end 5A of the wire as described in below. The hole 41a, a pair of the crimping pieces 43 and a pair of press pieces 44 are linearly arranged in a line.

One end 5A of the wire 5 is attached to the terminal 4 by a pair of wire crimping pieces 43 and a pair of the press pieces 44 of the wire attachment portion 42. In other words, the wire 5 is electrically connected to the terminal 4, thus is connected to the positive electrode 22 and the negative electrode 23 of each battery 20 through the busbars 3.

Also, the terminal 4 is connected to the voltage detection circuit that is provided to an ECU (Electronic Control Unit) not shown in the drawings through the wire 5 that is connected to the terminal 4. Thus, the ECU detects the amount remaining in each battery 20, and electric charge/discharge state or the like of each battery 20. In other words, the terminal 4 functions as the voltage detection terminal that is used in the detection of the voltage on the basis of the electric charge difference (voltage) of the pair of electrodes 22 and 23 in each battery 20, which is detected by the voltage detection circuit.

The wire 5 is a well known coated wire having a conductive core wire and an insulated coating portion that coats the core wire. The insulated coating of the wire 5 is peeled in one end 5A thereof so that the core wire is exposed. One end 5A of the wire 5 is electrically connected to the terminal 4 and the other end 5B of the wire 5 is connected the voltage detection circuit or the like that the ECU includes not shown in the drawings.

The plate 6 has a plurality of first receiving portions 60, second receiving portions 64 as a plurality of wire arrangement groove portions, a plurality of third receiving portions 68, a plurality of lid portions 67 and wire drawing pieces 96 that are integrally formed with one another using synthetic resin, for example.

The first receiving portion 60 includes a bottom wall portion 61 having a substantially rectangular plate shape as the same that of the busbar 3 and a peripheral wall portion 62 that is vertically provided from the edge of the bottom wall portion 61, and is formed in a substantially tank shape. A pair of holes (not shown) that is overlapped with a pair of holes 3a of the busbar 3 is provided in the bottom wall portion 61. The busbar 3 and the terminal 4 are overlapped sequentially in the interior surface (in other words, the surface that is surrounded by the peripheral wall 62) of the bottom wall portion 61. That is to say, each individual busbar 3 and the terminal 4 is received in the inside of the first receiving portion 60. Thus, the positive electrode 22 or the negative electrode 23 of each battery 20 sequentially passes the pair of holes of the bottom wall portion 61 and the holes 3a of busbar 3, and any one of the positive electrode 22 or the negative electrode 23 passes through the hole 4a of the terminal 4. Also, longitudinal direction of the plurality of first receiving portions 60 is aligned in a row along the arrangement direction (the arrow X direction) of a plurality of batteries 20, so that they are connected by the connection member 63 each other.

The connection member 63 is a semi-circular cylindrical shape having a C-shaped cross section and is formed elastically deformably, and a pair of both end portions thereof is connected facing peripheral wall portion 62 in the first receiving portions 60 so that they are adjacent to each other. The connection member 63 is far away or close to the adjacent first receiving portion 60 by elastically deforming and absorbs shape error of each battery 20, the plate 6 or the like, so that the assembly of the electric power source 10 can be improved.

The second receiving portion 64 is formed in groove shape (tank shape) having a U-shaped cross section that includes a bottom wall portion 65 having a long rectangular plate shape and a pair of side wall portions 66 and 66 which are vertically provided from the both ends facing the bottom wall portion 65 in the width direction, and receives a plurality of wires 5 to the inside thereof. The plurality of second receiving portions 64 aligned in a row with the longitudinal direction thereof follows along the arrow X direction. The row including the plurality of second receiving portions 64 is arranged in parallel with a gap between the row including the plurality of first receiving portions 60 along the orthogonal direction (in the arrow Y direction) to the arrow X direction.

The third receiving portion 68 is formed in the tank shape and is provided along the arrow Y direction so as to communicate with the first receiving portion 60 and the second receiving portion 64. The third receiving portion 68 includes a bottom wall portion 69 and a pair of connection wall portions 70, wherein the bottom wall portion 69 connects the bottom wall portion 61 of the first receiving portion 60 and the bottom wall portion 65 of the second receiving portion 64 facing each other and the pair of connection wall portions 70 connects the peripheral wall portion 62 of the first receiving portion 60 and the side wall portion 66 of the second receiving portion 64 facing each other. A wire attachment portion 42 of the terminal 4 and one end 5A of the wire 5 are arranged within the third receiving portion 68.

And, as shown in FIG. 3, the other end 5B of the wire 5 of which one end 5A is received in the third receiving portion 68 is curved substantially 90° and received in the second receiving portion 64. And, a pair of upper wall portions 71 that is protruded to be close each other, is provided in the upper end portion that is apart from the bottom wall portion 69 of the pair of connection wall portions 70. The third receiving portion 68 maintains wire 5 and the wire attachment portion 42 of the terminal 4 between the pair of upper wall portion 71 and the bottom wall portion 69, so as to prevent the wire 5 escaping from the third receiving portion 68.

The lid portion 67 is formed in the rectangular shape and covers the second receiving portion 64 so as to close the groove opening 98 of the second receiving portion 64. The width of the lid portion 67 is slightly larger than that of the groove opening 98 of the second receiving portion 64. A part of the lid portion 67 of the edge portion of one of both edge portion (long side portion) facing along the width direction (short side direction) is continuously provided to the upper end that is distant from the bottom wall portion 65 in one side wall portion 66 of the second receiving portion 64 through the first hinge 91. In other words, the rotation axis of the first hinge 91 is provided along the arrow X direction, and the lid portion 67 that can be able to open/close about the first hinge 91 as the center of rotation is provided in the second receiving portion 64. The first hinge may merely refer to a hinge.

A lock click 94 is provided in the edge portion of the other side of the lid portion 67, wherein the lock click 94 is engaged in the click receiving portion 93 that is provided in the outer surface of the other side wall portion 66 of the second receiving portion 64. The lock click 94 is engaged in the click receiving portion 93, so that it maintains the state that the lid portion 67 covers the second receiving portion 64 (in other words, closed state). The lock click 94 is provided in to face the first hinge 91 in the width direction. In other words, a direction in which a center position P of the first hinge 91 in the arrow X direction and a center position Q of the lock click 94 in the arrow X direction are aligned is provided in parallel to the width direction of the lid portion 67 (in other words, the width direction of the second receiving portion 64 or the arrow Y direction) (includes substantial parallel). The click receiving portion 93 and the lock click 94 may refer to an engagement portion.

Figure 6:
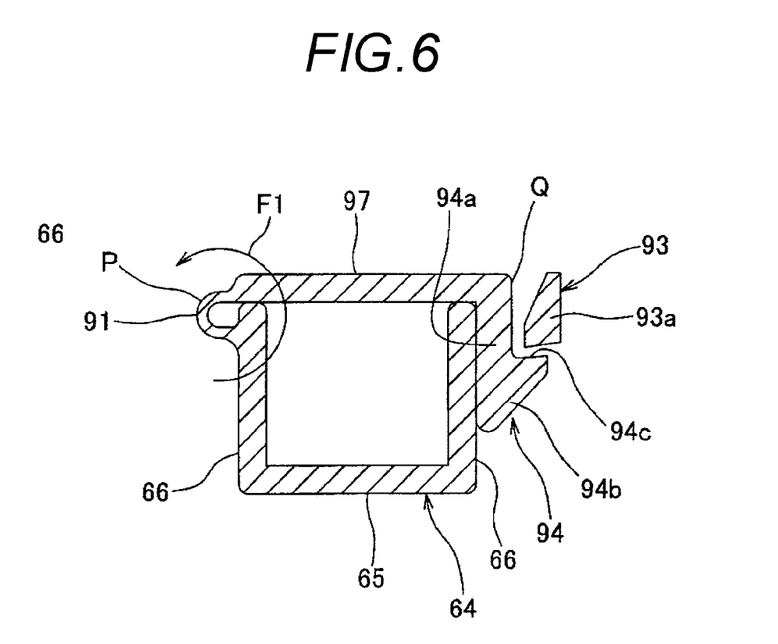
FIG. 6 is a cross sectional view taken along line B-B of FIG. 5.

The click receiving portion 93 is provided at an outer surface of the other side wall portion 66 of the second receiving portion 64 near the upper end (a surface facing the click receiving portion 93 of the first receiving portion 60). Both end portions of a rod-shaped member is bent in a right angle toward the same direction, so as to be formed with substantially C shape and both end portion of C shape are provided in the outer surface. As shown in FIG. 6, the lock click 94 includes a rectangular shaped main body 94a that is continuously provided in the other edge portion of the lid portion 67 toward the crossing direction in a right angle to the lid portion 67 and an arrowhead portion 94b that has a wedge shape in cross section which is continuously provided in the front end of the main body 94a. An engaging surface 94c that faces the lid portion 67 is provided in the place that the main body 94a is continuously provided in the arrowhead portion 94b. The lock click 94 is engaged in the click receiving portion 93 after the arrowhead portion 94b is elastically deformed and passed through a gap between the outer surface and a portion (a lateral rod portion 93a) that is arranged in parallel to the outer surface in the click receiving portion 93 and thus the engaging surface 94c of the arrowhead portion 94b that is returned from the elastic deformation comes into contact with the lateral rod portion 93a. In other words, the lid portion 67 and the other side wall portion 66 of the second receiving portion 64 are engaged each other by the click receiving portion 93 and the lock click 94. In addition, in FIG. 6, for the sake of a brief description, the gap between the engaging surface 94c and the lateral rod portion 93a is provided, however they are coming into contact with each other in practice.

A plurality of lid portions 67 is continuously provided to the corresponding second receiving portion 64 through the first hinge respectively, and the long direction thereof is lined in a row along the X direction. Also, some of the lid portions 67 are arranged so as to provide a gap 95 in which the wire is taken out from the second receiving portion 64 between the some lid portions 67 and the other lid portion 67 that is adjacent to some of the lid portions 67. The gap 95 is also a portion in which the lid portion 67 does not cover the groove opening 98 of the second receiving portion 64.

The wire drawing piece 96 is formed in a substantially T shape and an end of a portion corresponding to the vertical rod of T is continuously provided in the edge portion 79 (short side portion) facing the gap 95 in the lid portion 67 through the second hinge 92. In other words, the rotation axis of the second hinge 92 is provided along the arrow Y direction, thus the wire drawing piece 96 is rotatably provided about the second hinge 92 as the center of rotation. A plurality of wires 5 that is taken out from the second receiving portion 64 through the gap 95 is attached (in other words, fixed) to the wire drawing piece 96 by the tape 97 as a constraining member. Thus, the wire drawing piece 96 supports a plurality of wires 5 along the predetermined direction.

A plurality of plates 6 is lined in a row along the arrow X direction, and is connected to each other by a connection portion which is not shown in the drawings. Furthermore, the row including the plurality of plates 6 is connected to each other in two lines with a gap along the arrow Y direction. In other words, as shown in FIG. 1, the row including the plurality of second receiving portions 64, the row including the plurality of first receiving portions 60, the row including the plurality of first receiving portions 60, and the plurality of second receiving portions 64 are arranged sequentially in parallel to each other along the Y direction with gap therebetween. Also, the plurality of plates 6 that are connected to each other is overlapped in the upper surface 2a, wherein a overall planar shape of the plate has substantially rectangular shape the same as that of the upper surface 2a on which the electrode 22 and 23 of the battery assembly 2 are provided.

Next, an assembly method of the above described busbar module 1 will be described with reference to FIG. 4 and FIG. 5.

Figure 4:
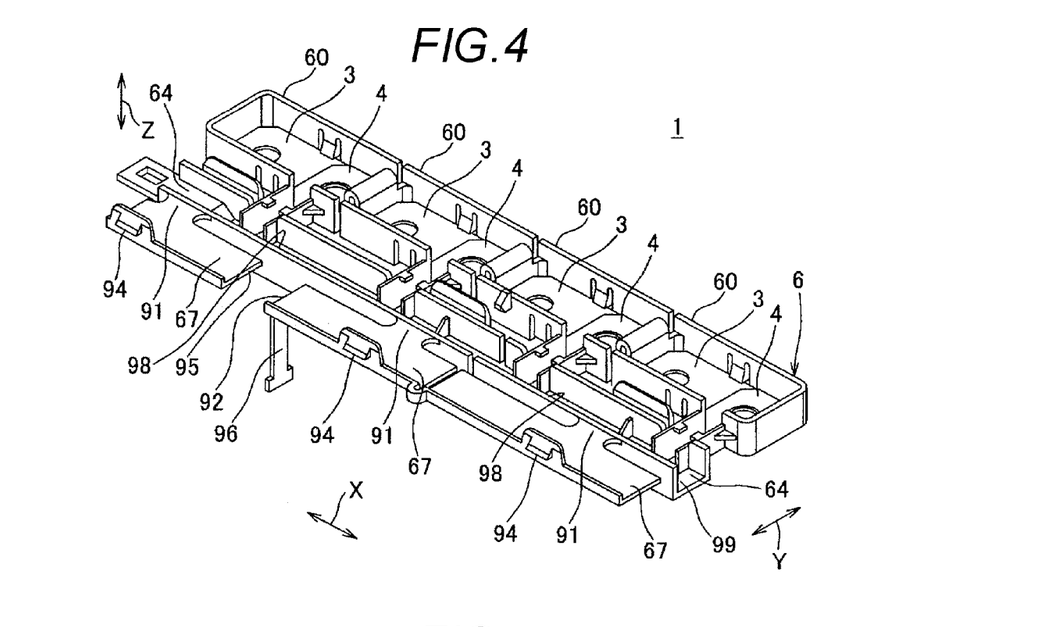
FIG. 4 is a perspective view showing a second receiving portion before covering the lid portion when the busbar module of FIG. 2 is assembled.
Figure 5:
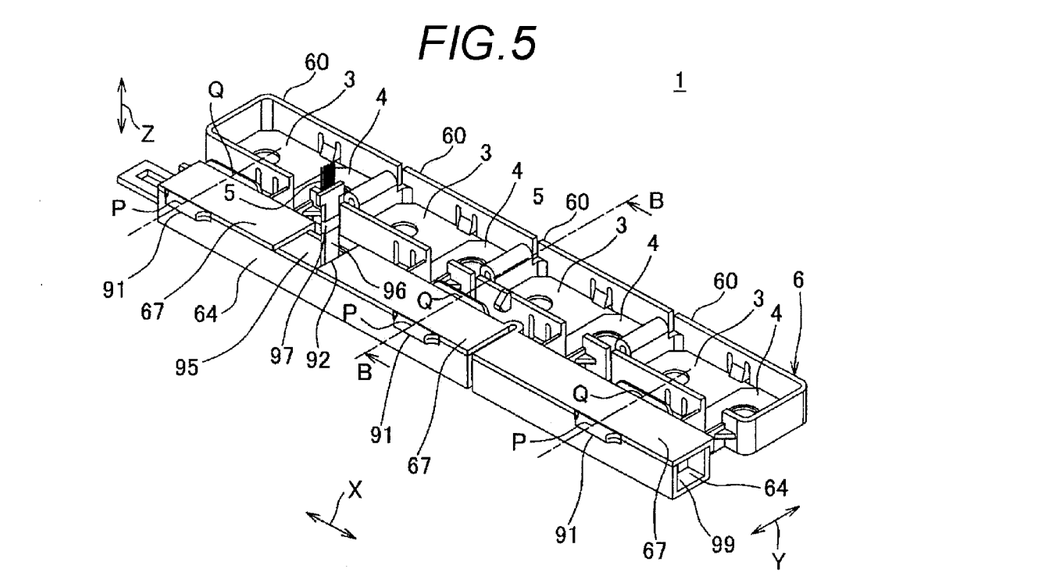
FIG. 5 is a perspective view showing the second receiving portion after covered by the lid portion when the busbar module of FIG. 2 is assembled.

First of all, as shown in FIG. 4, the busbar 3 and the terminal 4 in which the wire 5 is attached in advance are sequentially received in the first receiving portion 60 of the plate 6, and the wire 5 that is attached in the terminal 4 is received in the second receiving portion 64. Thus, as shown in FIG. 5, after the first hinge 91 is bent so that each lid portion 67 is rotated about the first hinge 91 as the center of rotation, each lid portion 67 covers the second receiving portion 64 so as to seal the groove opening 98 of the second receiving portion 64 and the click receiving portion 93 and the lock click 94 are engaged with each other. Thus, some of the wires 5 are taken out from the gap 95 that is provided between one lid portion 67 and another lid portion 67 adjacent to the one lid portion 67, then the wires 5 are fixed by the tape 97 to the wire drawing piece 96 that is provided in the edge portion 79 of the lid portion 67 facing the gap 95. Thus, the wire drawing piece 96 is rotated about the second hinge 92 as the center of rotation from the position of FIG. 5 and the wire drawing piece 96 is overlapped and arranged to the lid portion 67 so that a plurality of wires 5 that is fixed in the wire drawing piece 96 follows the arrow X direction. As described above, the busbar module 1 is assembled.

Next, description will be made regarding an operation of the above described busbar module 1 of the invention with reference to FIG. 6.

In the busbar module 1, the second receiving portion 64 is sealed at the groove opening 98 by the lid portion 67 that is continuously provided through the first hinge 91. At this time, the first hinge 91 is in the curved state and the lock click 94 is engaged in the click receiving portion 93. Thus, in the state, the curved first hinge 91 is returned to the original shape so that the rotation force F1 (in other words, the force that turns up the lid portion 67 about the first hinge 91 as a center of rotation) that rotates the lid portion 67 about the first hinge 91 as the center of rotation in counterclockwise in the drawing, along the width direction from the center position P of the first hinge 91 with respect to the lid portion 67 is generated. However, the lock click 94 that is provided to face the first hinge 91 in the width direction is engaged with the click receiving portion 93, so that the other side edge portion facing the center position P of the first hinge in the width direction is not floated.

As described above, according to the embodiment of the invention, in the plate 6, the direction of the center position P of the first hinge 91 that continuously contacts the lid portion 67 in one side wall portion 66 of the second receiving portion 64 and the center position Q of the lock click 94 that engages the lid portion 67 with the other side wall portion 66 of the second receiving portion 64 are lined is provided in parallel to the width direction of the second receiving portion 64. Thus, in the state that the lid portion 67 covers the second receiving portion 64, even when the curved first hinge 91 is to be returned to the original shape (in other words, the lid portion is opened state) so that the turning up force that turns up the lid portion 67 about the first hinge 91 as the center of rotation along the width direction from the center position P of the first hinge 91 is generated, the other side edge portion of the lid portion 67 facing the center position P of the first hinge 91 in the width direction is engaged in the other side wall portion 66 by the lock click 94 and the click receiving portion 93. Thus, it is possible to prevent a part of the lid portion 67 from being floated due to twisting of the lid portion and the opening of the lid portion 67 can be prevented.

Also, the above described embodiments are nothing more than the representative embodiments and the invention is not limited to the embodiments. In other words, a number of modifications can be made to the embodiments without substantially departing from the gist of the invention.

What is claimed is:

1. A busbar module, comprising:
   a plurality of busbars that connect respective batteries of a battery assembly having a plurality of batteries;
   a plurality of wires that is connected to the respective batteries through the plurality of busbars; and
   a wire arrangement body comprising
   a wire arrangement groove portion of a tank shape that has a bottom wall portion and both side wall portions configured to receive a plurality of wires;
   a lid portion that is rotatably connected to one side wall portion of the wire arrangement groove portion through a hinge and covers the wire arrangement groove portion so as to seal a groove opening of the wire arrangement groove portion; and
   an engagement portion provided on the other side wall portion for engaging or latching the lid portion when the lid portion covers the wire arrangement groove portion,
   wherein the wire arrangement body is provided so that a center position of the hinge and a center position of the engagement portion are aligned in parallel with a width direction of the wire arrangement body.

2. A power-supply unit, comprising:
   a battery assembly having a plurality of batteries; and
   a busbar module as defined in claim 1, that is attached in an overlapped manner to the battery assembly and connects the respective batteries to each other.

3. The busbar module according to claim 1, wherein the engagement portion includes a click receiving portion provided in an outer surface of the other side wall portion of the wire arrangement groove portion and a lock click provided in an edge portion of the lid portion, and to be engaged with the click receiving portion.

* * * * *